United States Patent [19]

Sitzler et al.

[11] Patent Number: 5,193,451
[45] Date of Patent: Mar. 16, 1993

[54] BELT PRESS FOR MAKING PANELS

[75] Inventors: Hans-Dietrich Sitzler, Nettetal 1-Hinsbeck; Dieter Lagodka, Ratingen, both of Fed. Rep. of Germany

[73] Assignee: G. Siempelkamp GmbH & Co., Krefeld, Fed. Rep. of Germany

[21] Appl. No.: 761,063

[22] Filed: Sep. 17, 1991

[30] Foreign Application Priority Data

Sep. 25, 1990 [DE] Fed. Rep. of Germany ....... 4030228

[51] Int. Cl.$^5$ .......................... B30B 5/06; B30B 15/26
[52] U.S. Cl. ................................... 100/43; 100/151; 100/154; 425/371; 198/813
[58] Field of Search ................ 100/43, 151, 153, 154, 100/215; 425/371; 198/626.4, 626.6, 813, 814, 816

[56] References Cited

U.S. PATENT DOCUMENTS

| | | | |
|---|---|---|---|
| 2,957,572 | 10/1960 | Dvorak | 198/813 |
| 3,431,595 | 3/1969 | Plum | 100/215 |
| 3,521,552 | 7/1970 | Knapp | 100/154 |
| 3,945,789 | 3/1976 | Boman | 425/371 |
| 4,117,699 | 10/1978 | Renaut | 198/626.6 |
| 4,449,448 | 5/1984 | Stabler | 100/153 |
| 4,718,843 | 1/1988 | Carlsson | 100/93 RP |
| 4,902,384 | 2/1990 | Anstotz | 100/153 |
| 4,923,384 | 5/1990 | Gerhardt | 425/371 |

FOREIGN PATENT DOCUMENTS 2104490 8/1972 Fed. Rep. of Germany ........ 100/43
2643346 11/1980 Fed. Rep. of Germany .

Primary Examiner—Philip R. Coe
Assistant Examiner—Randall E. Chin
Attorney, Agent, or Firm—Herbert Dubno; Andrew Wilford

[57] ABSTRACT

A belt press has horizontally extending and vertically spaced upper and lower plates defining a horizontally extending gap, vertically spaced upper and lower upstream drums rotatable about respective horizontal drum rotation axes at the upstream press end, and vertically spaced upper and lower downstream drums rotatable about respective horizontal drum rotation axes at the downstream press end. Each of the downstream drums is supported for at least limited pivoting about a vertical axis generally intersecting the respective drum rotation axis. Upper and lower endless belts spanned over the respective upper and lower drums each have a working stretch lying between the plates and a return stretch. Upper and lower pairs of horizontally spaced outer adjustment rollers rotatable about respective horizontal axes fixed each engage the respective working stretch in a predetermined vertical direction and respective upper and lower central adjustment rollers positioned between the respective outer rollers engage the respective working stretch in a vertical direction opposite to the respective outer rollers. Each central adjustment roller can pivot about a horizontal axis generally centrally passing perpendiculary through the respective central adjustment roller. Sensors detect the position of the belt transversely of the direction and a controller pivots the drums and central adjustment rollers about the respective adjustment axes in response to the respective detected belt position.

5 Claims, 7 Drawing Sheets

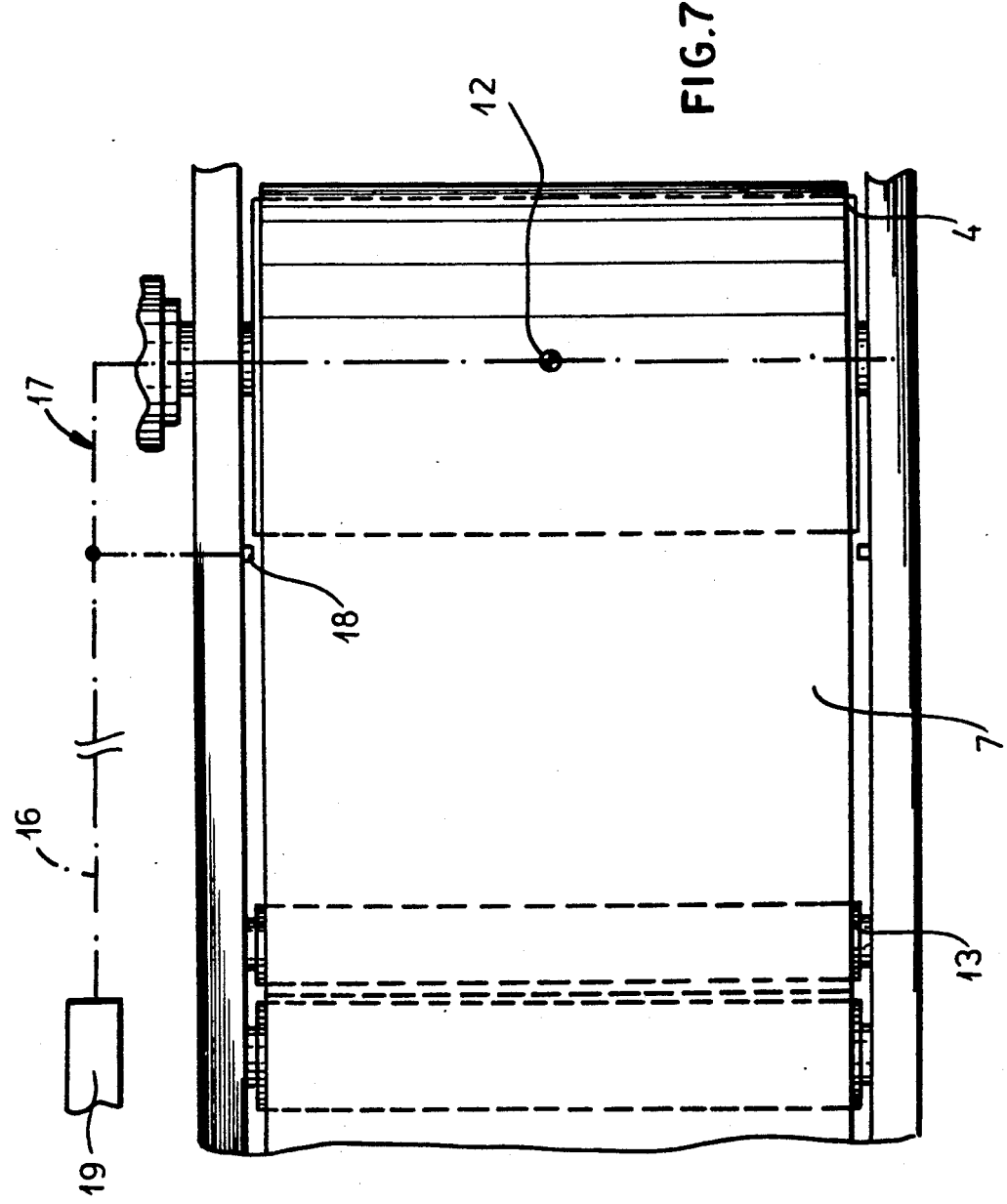

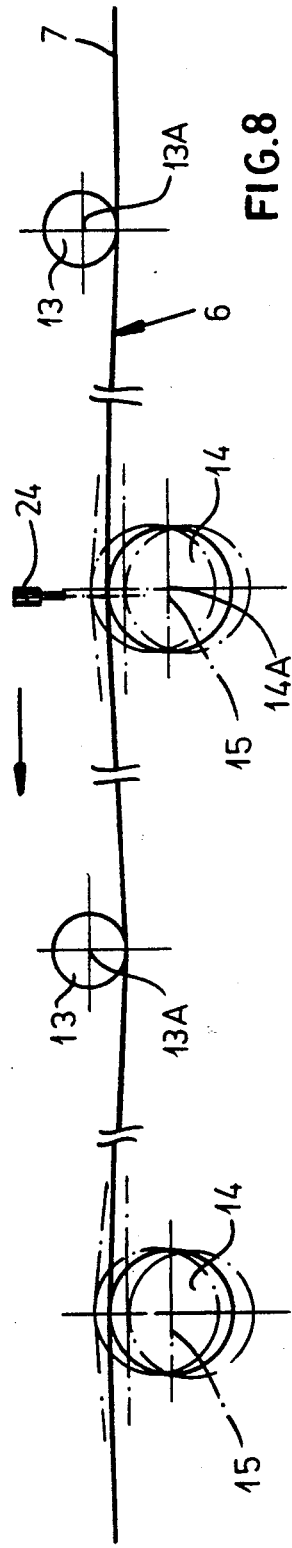
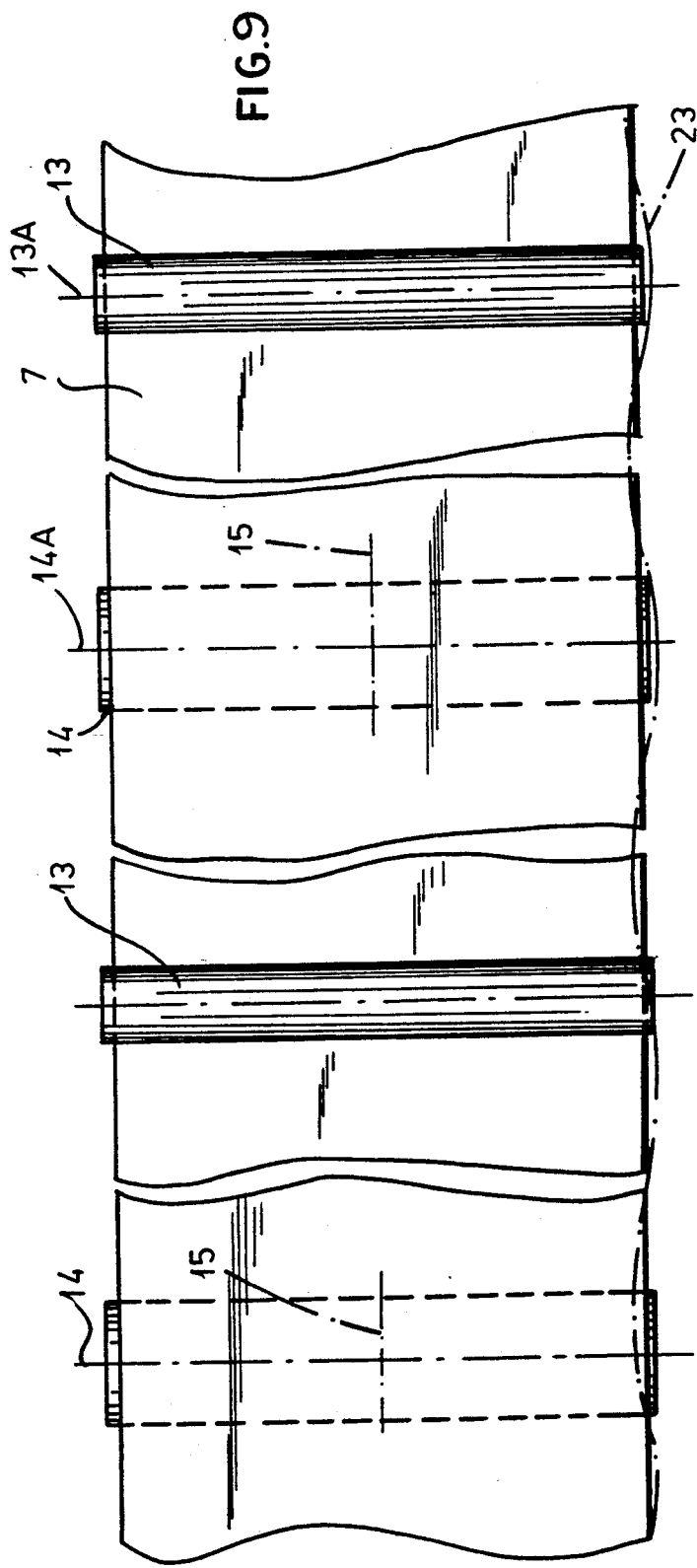

BELT PRESS FOR MAKING PANELS

FIELD OF THE INVENTION

The present invention relates to a belt-type continuous press. More particularly this invention concerns such a press used to make panels such as fiberboard, chipboard, plywood, and the like.

BACKGROUND OF THE INVENTION

A standard belt press has a frame having horizontally extending and vertically spaced upper and lower plates defining a horizontally extending gap having an upstream end and a downstream end, vertically spaced upper and lower upstream drums rotatable about respective horizontal axes at the upstream end, vertically spaced upper and lower downstream drums rotatable about respective horizontal axes ad the downstream end, and upper and lower endless belts spanned over the respective upper and lower drums and each having a working stretch lying between the plates and a return stretch. Upper and lower sets of rollers engaged between the working stretches and the respective plates can be recirculated as the belts are advanced to move the working stretches horizontally in a transport direction to displace a workpiece in the direction through the gap so that the working stretches are supported on the respective plates by these rollers.

As described in German patent document 2,643,346 the drums are pivotal about vertical axes that centrally intersect their rotation axes. Thus these drums can swing limitedly with their axes moving in horizontal planes. The disadvantage of this is that as the drums are moved to adjust the belts on center they have a deleterious effect on the tension in the belt, which in turn affects how the rollers move. This is particularly the case when the rollers are not constrained or guided, that is when they can move fairly freely at some spacing from one another and when they have a length which is equal to the width of the belts. In particular when the belts are very long, it is hard to keep them aligned in such a press.

OBJECTS OF THE INVENTION

It is therefore an object of the present invention to provide an improved belt-type continuous press.

Another object is the provision of such an improved belt-type continuous press which overcomes the above-given disadvantages, that is which, even when fairly long, can keep its belts on center in a fairly simple manner.

SUMMARY OF THE INVENTION

A continuous belt press according to this invention has a frame having horizontally extending and vertically spaced upper and lower plates defining a horizontally extending gap having an upstream end and a downstream end, vertically spaced upper and lower upstream drums rotatable on the frame about respective horizontal drum rotation axes at the upstream end, and vertically spaced upper and lower downstream drums rotatable on the frame about respective horizontal drum rotation axes at the downstream end. Each of the downstream drums is supported on the frame for at least limited pivoting on the frame about a vertical axis generally intersecting the respective drum rotation axis. Upper and lower endless belts spanned over the respective upper and lower drums each have a working stretch lying between the plates and a return stretch and upper and lower sets of rollers are engaged between the working stretches and the respective plates. The belts are advanced to move the working stretches horizontally in a transport direction to displace a workpiece in the direction through the gap. Upper and lower pairs of horizontally spaced outer adjustment rollers rotatable about respective horizontal axes fixed on the frame each engage the respective working stretch in a predetermined vertical direction and respective upper and lower central adjustment rollers positioned between the respective outer rollers engage the respective working stretch in a vertical direction opposite to the vertical direction of the respective outer rollers. Each of the central adjustment rollers can pivot about a horizontal axis generally centrally passing perpendicularly through the respective central adjustment roller. Sensors detect the position of the belt transversely of the direction and a controller pivots the drums and central adjustment rollers about the respective adjustment axes in response to the respective detected belt position.

Thus with this system the adjustment rollers can be used to compensate not only for belt position, but for a belt that is not perfectly flat. The belt is typically made of stainless steel or a succession of plates thereof, and it frequently is not perfectly flat, having wavy edges. The adjustment rollers can keep the belt centered and tight in spite of such wavy edges.

According to the invention the controller includes means for comparing outputs of the sensors to respective set points. While the various adjustments can be carried out separately, with a sensor next to each adjustable drum or roller, according to this invention a common controller is connected to all of the sensors. This way the adjustments are made globally, taking all inputs into account.

In accordance with a further feature of this invention each of the upstream drums is at least limitedly pivotal on the frame about a vertical axis generally intersecting the respective drum rotation axis. Similarly means is provided for recirculating the rollers and for feeding same at the upstream end between the plates and the respective working stretches and this means is supported for at least limited pivoting on the frame about a vertical axis generally intersecting the respective drum rotation axis.

BRIEF DESCRIPTION OF THE DRAWING

The above and other objects, features, and advantages will become more readily apparent from the following, reference being made to the accompanying drawing in which:

FIGS. 5, 6, and 7 are top views of the structure shown in FIGS. 2, 3, and 4, respectively;

FIG. 8 is a small-scale side view in largely diagrammatic form showing the return stretch of the belt; and FIG. 9 is a top view of the structure of FIG. 8.

SPECIFIC DESCRIPTION

Figure 1:
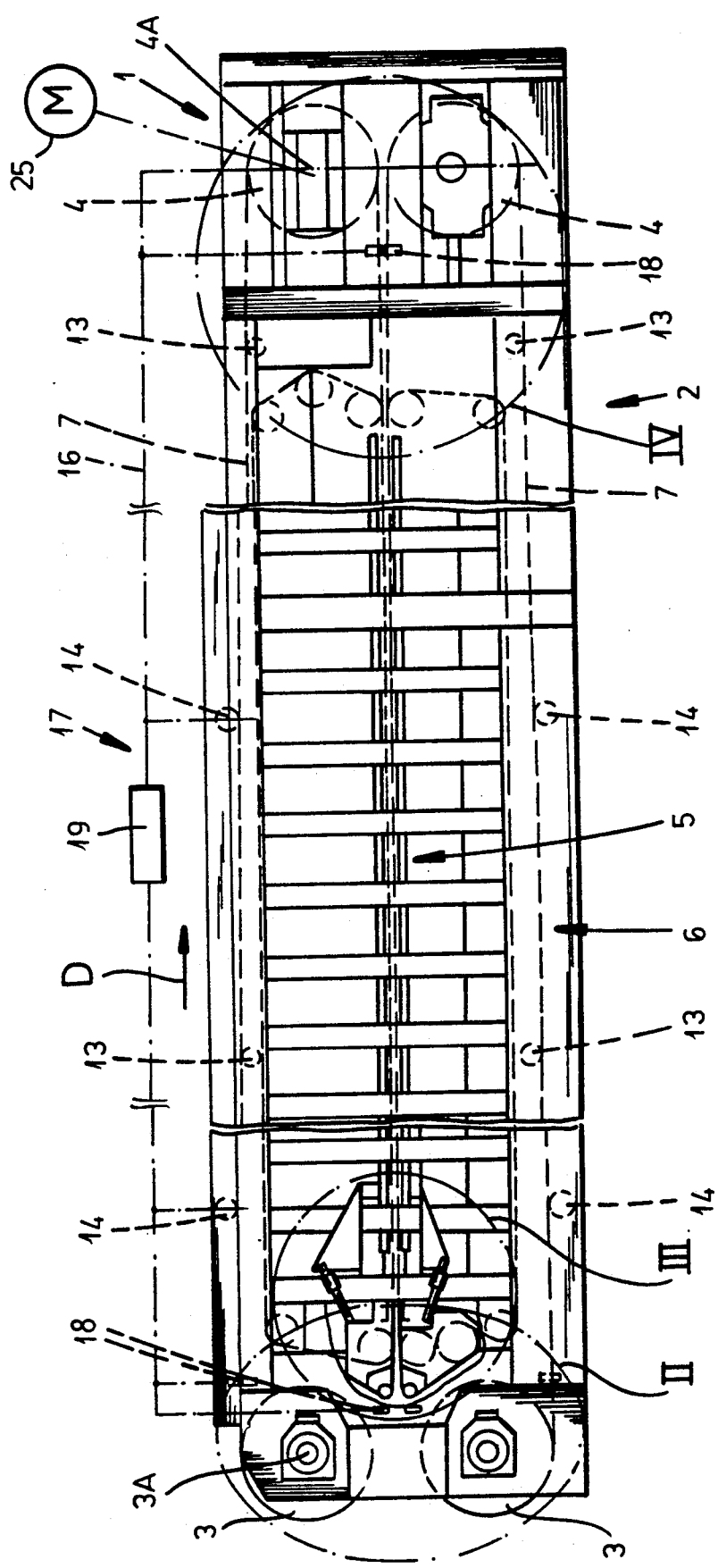
FIG. 1 is a partly diagrammatic side view of the press according to this invention.
Figure 3:
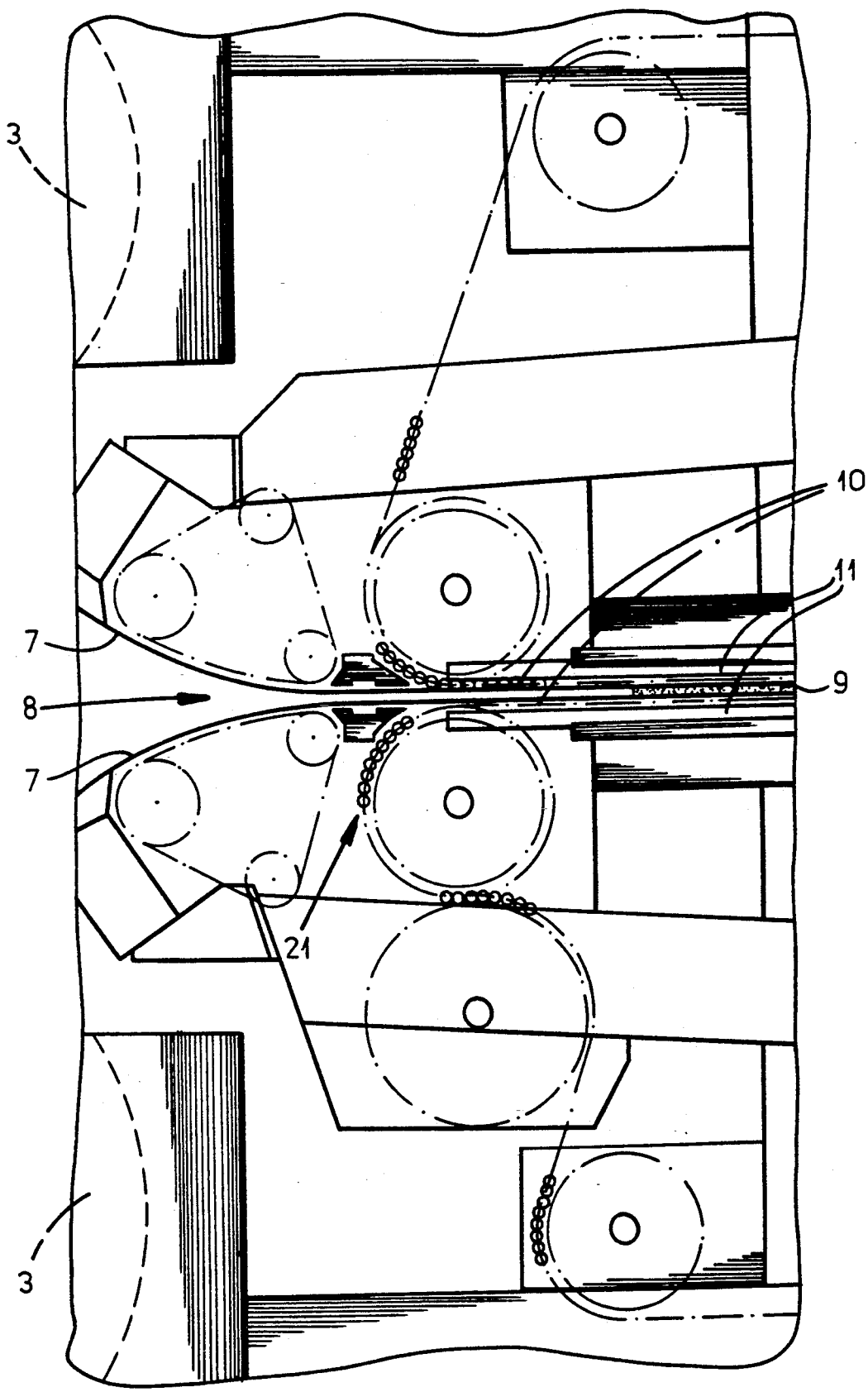

As seen in FIG. 1 a press according to this invention has an upper part 1 and a lower part 2 each having at an upstream end (left hand in the drawing) an upstream drive drum 3 and at a downstream end a downstream drive drum 4 rotatable about respective horizontal axes 3A and 4A perpendicular to a transport direction D. Spanned over each pair of drums 3 and 4 is a respective belt 7 having a working stretch 5 and a return stretch 6, with the working stretches 5 defining a horizontally extending press gap 8 (FIG. 3). A motor 25 is connected to some of the drums 3 and 4 to advance a workpiece mat 9 in the direction D along the gap 8. Roller rods 10 can move along between each of the working stretches 5 and a respective plate 11 of the respective press half 1 or 2, and a recirculating device 21 shown in FIG. 3 is provided to feed the rollers 10 from the downstream ends of the press halves 1 and 2 to the upstream ends thereof.

Figure 2:
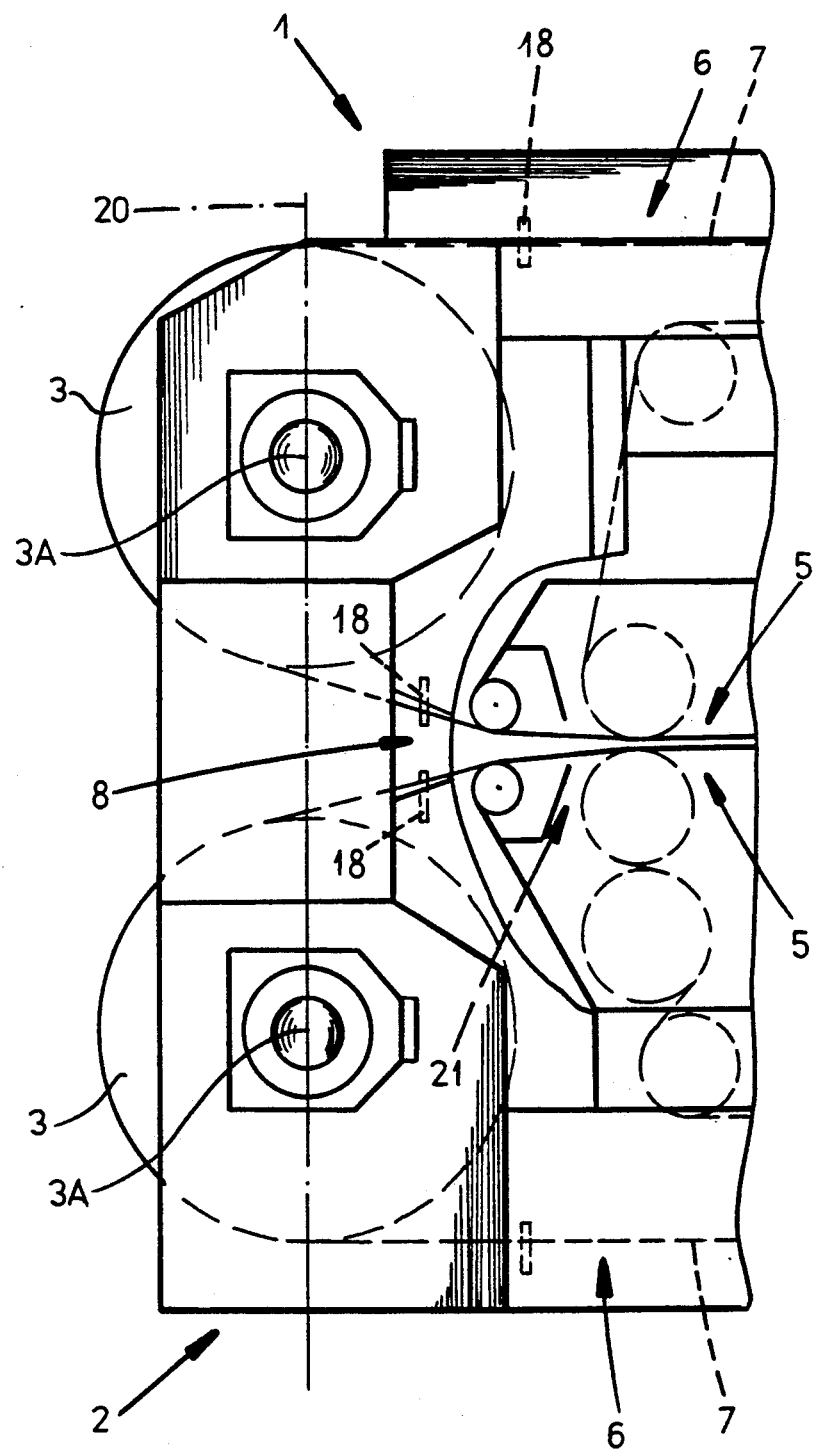
FIGS. 2, 3, and 4 are large-scale views of the details indicated respectively at II, III, and IV in FIG. 1.
Figure 4:
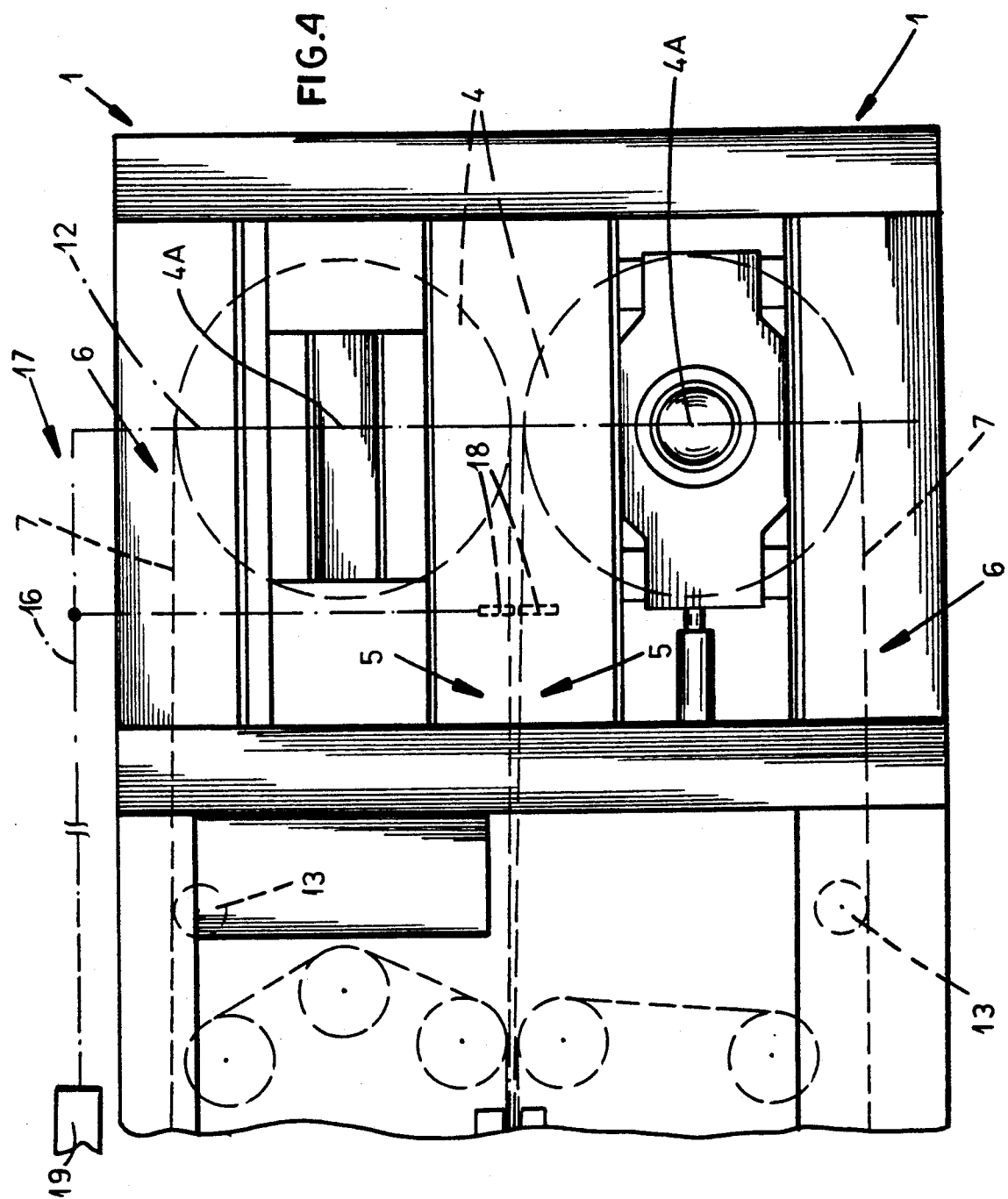
Figure 5:
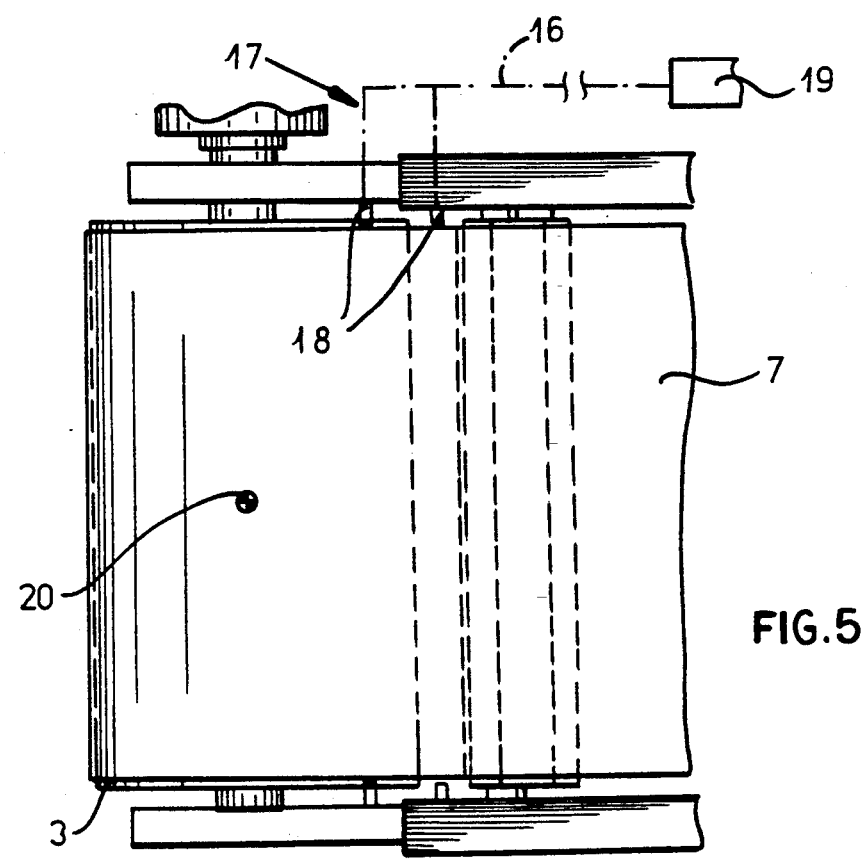

According to this invention the upstream drums are pivotal about vertical axes 20 (FIGS. 2 and 5) that perpendicularly centrally intersect their axes 3A so that these axes 3A can swing limitedly in horizontal planes parallel to the direction D. Similarly the downstream drums 4 are pivotal about vertical axes 12 (FIGS. 4 and 7) that perpendicularly centrally intersect their axes 4A so that these axes 4A can swing limitedly in horizontal planes parallel to the direction D.

Figure 6:
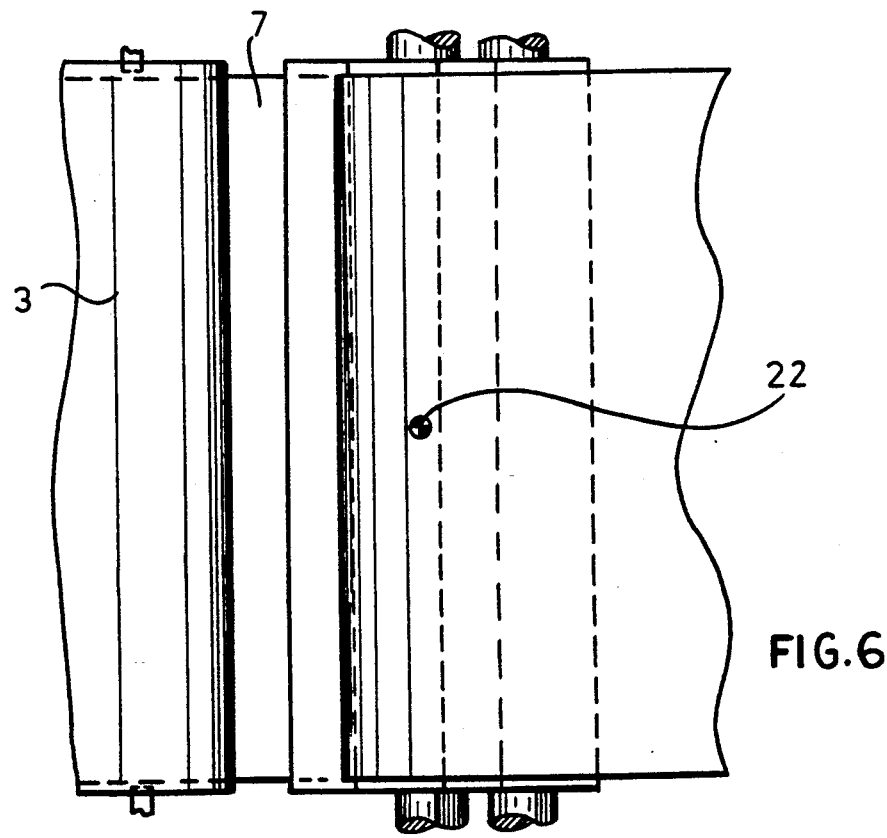

In addition as seen in FIGS. 8 and 9 each of the return stretches 6 is engaged on one side by a plurality of rollers 13 rotatable about horizontal fixed axes 13A extending perpendicular to the direction D but spaced apart in this direction. Interleaved with these rollers 13 are adjustment rollers 14 rotatable about respective axes 14A but mounted on the respective press halves 1 and 2 so that these axes 14a can pivot about horizontal axes 15 parallel to the direction D. The belt stretch 6 is deflected vertically back and forth as it passes between the rollers 13 and 14. The so-called "product side" of the belt 7, the face that engages the workpiece 9, engages the rollers 14 and it is even possible to shift these rollers perpendicular to the horizontal. The infeed device 21 for the rollers 10 can similarly be adjustable about an axis 22 as seen in FIG. 6

Sensors 18 are provided at the upstream and downstream ends of the upper and lower press halves 1 and 2 to detect the positions of the edges of the belts 7 immediately adjacent the drums 3 and 4. These sensors are connected together to a network 16 to individual controllers 19 of a control system 17 in turn connected to actuators such as illustrated at 24 in FIG. 8 to pivot the drums 3, 4, and 14 about the respective axes 20, 12, and 15. Normally the controllers 19 of the upper belt are not connected to those of the lower belt. The controllers 19 operate by comparing the incoming signals from the sensors 18 with set points and operating the actuators 24 accordingly.

With this system the belt position on the drums 3 and 4 is therefore adjusted not only by pivoting these drums 3 and 4, but also by pivoting the adjustment rollers 14, which allows belt position and tension to be very accurately established. Normally the attitude, that is the position about the axis 20, for the upstream drums 3 is adjusted manually when the press is set up and thereafter adjustments during operation are made by adjusting the attitudes of the drums 4 and rollers 14 in accordance with a program that is specific to the particular press. This allows the belt to run on center even if it is not perfectly flat as indicated in dot-dash lines 23 in FIG. 9.

I claim:

1. A continuous belt press comprising:
    a frame having horizontally extending and vertically spaced upper and lower plates defining a horizontally extending gap having an upstream end and a downstream end;
    vertically spaced upper and lower upstream drums rotatable on the frame about respective horizontal drum rotation axes at the upstream end;
    vertically spaced upper and lower downstream drums rotatable on the frame about respective horizontal drum rotation axes at the downstream end;
    mounting means supporting each of the downstream drums for at least limited pivoting of the respective drum on the frame about a respective vertical axis generally intersecting the respective drum rotation axis;
    upper and lower endless belts spanned over the respective upper and lower drums and each having a working stretch lying in the gap between the plates and a mainly horizontal return stretch lying outside the gap;
    upper and lower sets of rollers engaged between the working stretches and the respective plates;
    means connected to the drums for advancing the belts to move the working stretches horizontally in a transport direction to displace a workpiece in the direction through the gap;
    upper and lower pairs of horizontally spaced outer belt adjustment rollers rotatable about respective horizontal axes fixed on the frame and each engaging the respective return stretch in a predetermined vertical direction;
    respective upper and lower central adjustment rollers positioned between the respective outer rollers and engaging the respective return stretch in a vertical direction opposite to the vertical direction of the respective outer rollers;
    mounting means supporting each of the central adjustment rollers for pivoting of each central adjustment roller about a respective horizontal axis generally centrally passing perpendicularly through the respective central adjustment roller;
    sensor means for detecting the position of the belt transversely of the direction and generally parallel to the drum rotation axes; and
    respective control means connected to the sensor means for pivoting the drums and central adjustment rollers about the respective adjustment axes in response to the receptive detected belt position.

2. The belt press defined in claim 1 wherein the control means includes means for comparing outputs of the sensors to respective set points and for operating the control means in accordance with differences between the outputs and the receptive set points.

3. The belt press defined in claim 1 wherein a common control means is connected to all of the sensors.

4. The belt press defined in claim 1, further comprising:
    mounting means supporting each of the upstream drums for at least limited pivoting of each upstream drum on the frame about a respective vertical axis generally intersecting the respective drum rotation axis.

5. The belt press defined in claim 1, further comprising:
    means for recirculating the rollers and for feeding the rollers at the upstream end back between the plates and the respective working stretches; and
    mounting means supporting each of the recirculating means for at least limited pivoting of the recirculating means on the frame about a respective vertical axis generally intersecting the respective drum rotation axis.

* * * * *